United States Patent [19]

Yamaguchi

[11] Patent Number: 5,039,850
[45] Date of Patent: Aug. 13, 1991

[54] IC CARD

[75] Inventor: Atsuo Yamaguchi, Itami, Japan

[73] Assignee: Mitsubishi Denki Kabushiki Kaisha, Japan

[21] Appl. No.: 597,882

[22] Filed: Oct. 12, 1990

[30] Foreign Application Priority Data

Jun. 15, 1990 [JP] Japan .................................. 2-157845

[51] Int. Cl.⁵ ........................... G06K 5/02; G06K 9/03
[52] U.S. Cl. .................................... 235/492; 235/380;
235/382; 235/382.5
[58] Field of Search ............. 235/380, 492, 382, 382.5

[56] References Cited

U.S. PATENT DOCUMENTS

| | | | |
|---|---|---|---|
| 4,734,568 | 3/1988 | Watanabe | 235/380 |
| 4,746,788 | 5/1988 | Kawana | 235/380 |
| 4,777,355 | 10/1988 | Takahira | 235/380 |
| 4,837,422 | 6/1989 | Dethloff et al. | 235/380 |
| 4,845,351 | 7/1989 | Hara et al. | 235/492 |

FOREIGN PATENT DOCUMENTS 62-211756  9/1987  Japan .

OTHER PUBLICATIONS

Nikkei Electronics, No. 404, Sep. 22, 1986, pp. 133–144 and partial translation of p. 139.

Primary Examiner—Stuart S. Levy
Assistant Examiner—Richard M. Weinberg
Attorney, Agent, or Firm—Leydig, Voit & Mayer

[57] ABSTRACT

An IC card with a product test program contained therein is provided with a read-only memory. This read-only memory stores various routines, and is arranged such that if a secret code assigned exclusively to that IC card has been already written in a non-volatile memory in the IC card, an externally entered secret code is collated with the stored secret code, and, if the collation is successful, the non-volatile memory is initialized. The test program can be executed only after the initialization has been completed.

3 Claims, 3 Drawing Sheets

IC CARD

This invention relates to an IC card and particularly to an IC card which contains both a test program for testing the IC card itself and an application program for executing various intended functions of the IC card.

BACKGROUND OF THE INVENTION

A test program stored in an IC card itself is a program for performing substantially all tests on functions of the IC card, and, therefore, it can access any desired address in memories provided in the IC card. In order to prevent other programs stored in the IC card from being unlawfully read out through the test program and copied or destroyed, the test program must be executed with a high degree of security.

FIG. 1 is a general schematic block diagram of an IC card. In FIG. 1, an IC card 10 includes a central processor unit (CPU) 1 for executing and controlling various programs, and a system read-only-memory (ROM) 3 in which is stored a test program for various function tests of the product or IC card in the course of manufacturing it. The IC card further includes an application ROM 4 which stores an application program for executing various functions assigned to the IC card, a non-volatile electrically erasable and programmable read-only-memory (EEPROM) 5 in which a secret code assigned exclusively to that IC card indicating the type of that IC card, a write-verification code indicating that the secret code has been written, personal information of a user of that card, etc, are written and stored, and a random-access-memory (RAM) 6 for temporarily storing data. These components 1-6 are coupled to each other through a system bus 2. A terminal P1 is a positive power supply input terminal. A terminal P2 is a power supply ground terminal. A terminal P3 is a reset signal input terminal :o which a reset signal for initializing the CPU 1 is applied. A terminal P4 is a clock terminal to which a clock signal is applied. A terminal P5 is an I/O terminal to which an input/output circuit 7 is coupled. The input/output circuit 7 is coupled also to the system bus 2 for transferring via the I/O terminal P5 data between the IC card 10 and external apparatus (not shown).

Referring to FIG. 2 which illustrates a conventional IC card system, the IC card 10 shown in FIG. 1 is described in greater detail. As stated previously, the system ROM 3 stores a test program 31 with which an IC card manufacturer tests various functions and operations of the IC card during manufacturing, a branch routine 32 for making a decision as to which of the test program 31 and an application program 41 stored in the application ROM 4 should be executed, and making a branch to the program to be executed, a write-verification routine 34 for verifying that a secret code exclusively assigned to that IC card has been written in the EEPROM 5, and a secret-code verification routine 35 for verifying that a secret code externally entered via the I/O terminal P5 and the secret code already stored in the EEPROM 5 are coincident. The application ROM 4 stores the application program 41 which is used to execute various functions desired by a user of the card, as stated previously. After the completion of the manufacturing process of the IC card, a secret code 51 which is assigned exclusively to each IC card is written and stored in the EEPROM 5. In addition, a separate write-verification code 52 for verifying that the secret code assigned exclusively to that IC card has been written and stored is written and stored in the EEPROM 5. From this write-verification code 52, a decision is made whether an exclusively assigned secret code 51 has been written or not. The bit pattern of the write-verification code 52 is determined to be coincident neither with any bit patterns of initial values in the EEPROM 5 nor any bit patterns which may be subsequently set in the EEPROM 5.

In FIG. 2, when a reset signal is applied at the reset signal terminal P3, the CPU 1 reads out a starting address of the branch routine 32 stored at a predetermined address in the system ROM 3 and starts execution of the branch routine at the read out address. In the branch routine 32, when a command to execute the test program 31 is applied from external apparatus to the I/O terminal P5, the write-verification routine 34 is executed. In the write-verification routine 34, whether the secret code 51 has been written into the EEPROM 5 or not is determined on the basis of the write-verification code 52 stored in the EEPROM 5. If the secret code 51 has been already written, the secret-code verification routine 35 is executed. On the other hand, if no secret code has been written into the EEPROM 5 verification of the secret code is not Carried out, but the test program 31 is executed immediately. If the secret code 51 has been already written, it is collated with the secret code entered via the I/O terminal P5. Only when they are coincident with each other, is the test program 31 is executed. If they are not coincident, the operation is terminated. Thus the described prior art has an advantage that different secret codes can be used for respective cards since a secret code is stored in an EEPROM.

Personal information stored in IC cards of the above-stated type can be read or modified, using the test program. Specifically, the content of the EEPROM 5 can be illegally read out and copied or modified by a person who knows or comes to know by chance the secret code assigned to an IC card.

Japanese Published patent application 62-211756 discloses an IC card in which when a secret code, exclusively assigned to that card written and stored in it, and an externally entered secret code are coincident with each other, all data stored in a data memory are erased to thereby prevent data from leaking. This IC card however cannot be tested by a test program on various items prior to writing the secret code into the card.

The object of the present invention, therefore, is to provide an IC card so that even if some person intentionally or by chance comes to know the secret code which is exclusively assigned to that card, it is impossible to read out any data relating to the card owner from the EEPROM 5, while it is possible to freely test the IC card on various items, using a test program, before the exclusive secret code is written into the card.

SUMMARY OF THE INVENTION

According to the present invention, an IC card includes writable, non-volatile memory means. A secret code which differs from one card to another is written into the writable non-volatile memory means. The secret code is for identifying, for example, the type of the card. Also, a write-verification code for verifying that the secret code has already been written is written into the non-volatile memory means. The IC card includes first read-only-memory (ROM) means which stores an application program for executing desired functions of the IC card, second ROM means which stores a test program as well as a branch routine, a write verification routine, a secret-code verification routine and an initialization routine. The branch routine is for determining which of the test program and the application program should be executed. When it is determined that the test program is to be executed, the write-verification routine then determines from the write-verification code in the non-volatile memory means, prior to the execution of the test program, whether the secret code has been already written or not. If the write-verification routine verifies that the secret code has already been written, the secret-code verification routine collates the secret code entered from outside the card with the secret code in the non-volatile memory means. If the secret-code verification routine verifies that the externally entered secret code is coincident with the secret code stored in the non-volatile memory means, the initialization routine initializes the non-volatile memory means and enables the test program to be executed only after the completion of the initialization. The IC card further includes control means for executing and controlling the respective programs, input/output control means for controlling signal input and output from and to an external apparatus, and a system bus for signal transfer between the respective means.

For the execution of the test program, if a secret code assigned exclusively to one IC card has already been written into the non-volatile memory means, an externally entered secret code is verified and the non-volatile memory means is initialized, and, then, the test program can be executed. On the other hand, if the non-volatile memory means does not contain the secret code for that card, the test program can be executed without initializing the non-volatile memory means.

DETAILED DESCRIPTION OF PREFERRED EMBODIMENT

Figure 1:
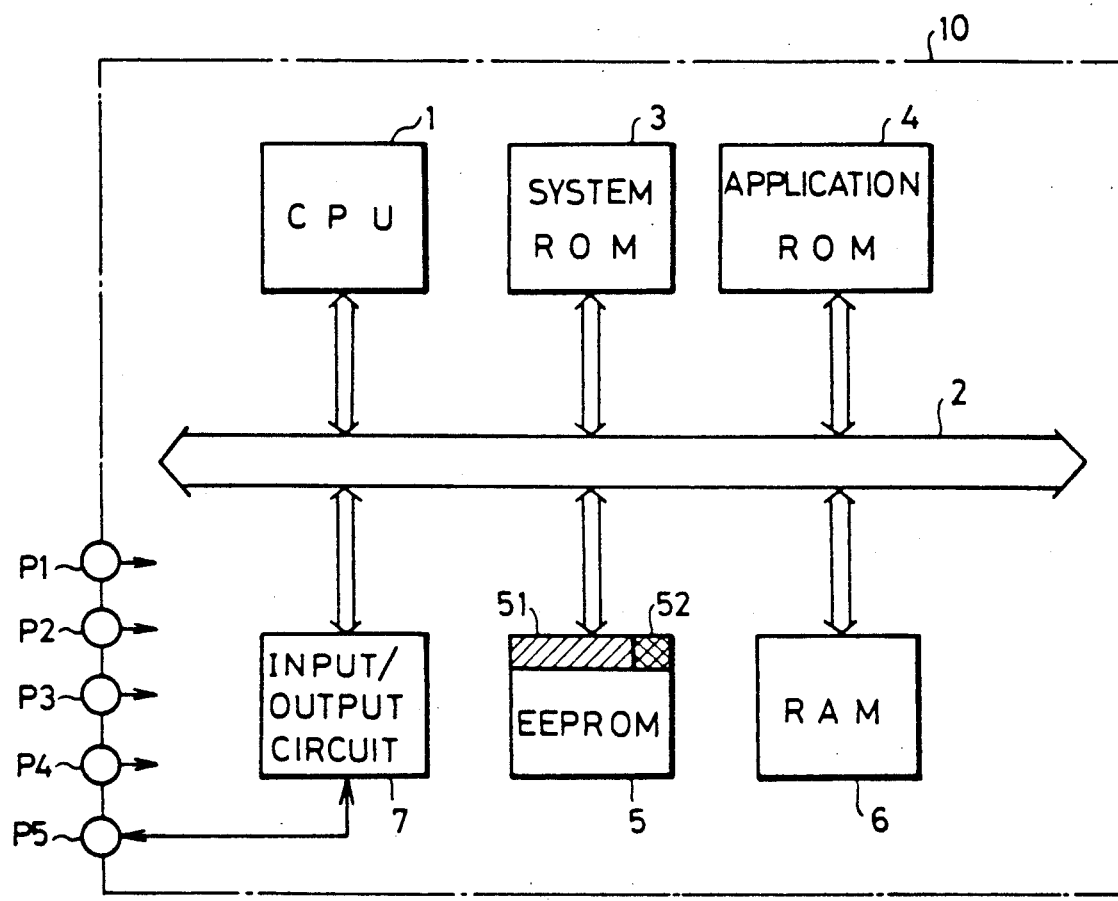
FIG. 1 schematically shows a general configuration of an IC card.
Figure 2:
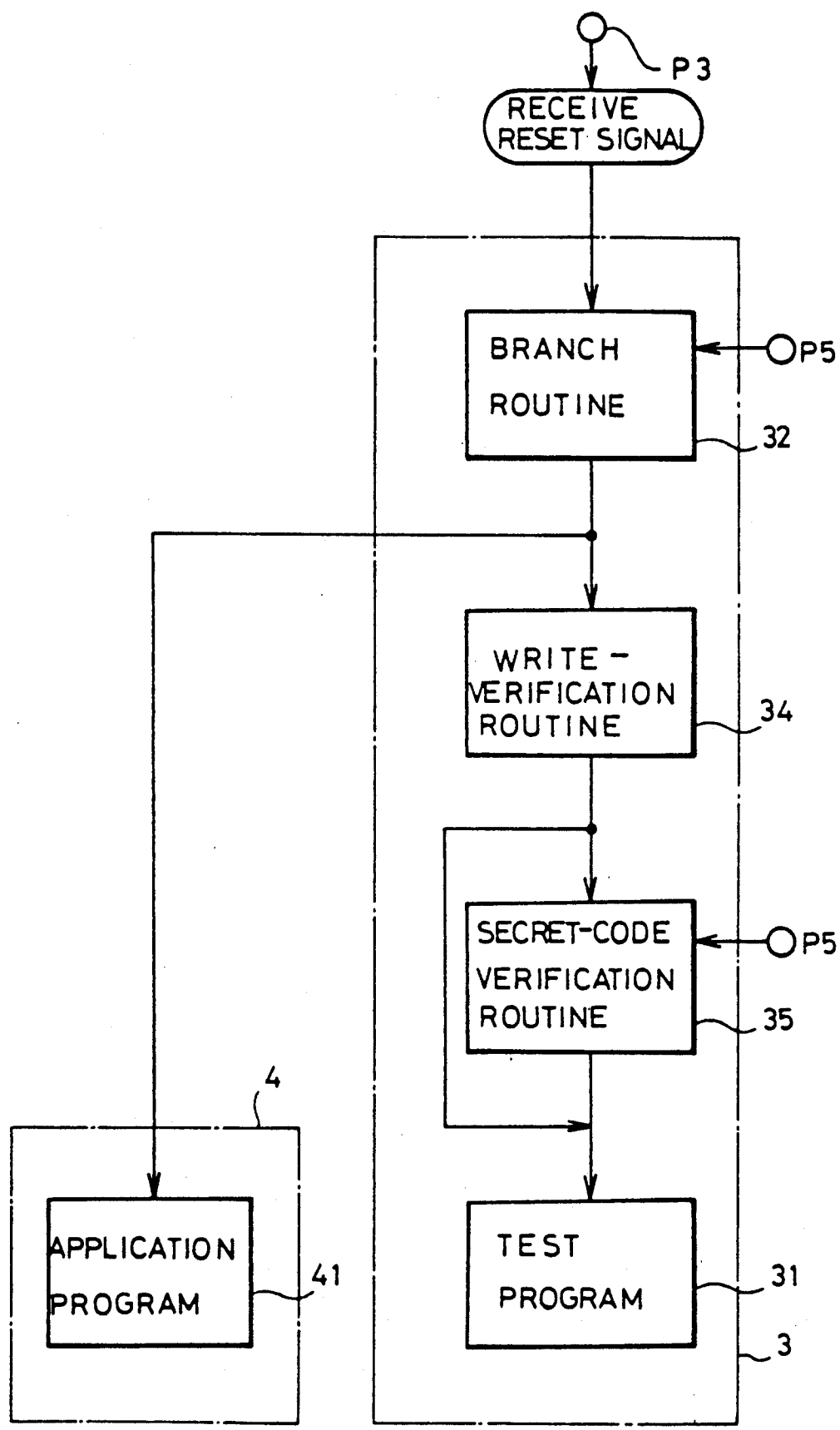
FIG. 2 is a flow chart useful for explaining the operation of a conventional IC card.

An IC card according to one embodiment of the present invention is now described with reference to FIGS. 1 and 3. The general arrangement of the IC card according to the present invention has no special difference from the arrangement shown in block in FIG. 1.

Figure 3:
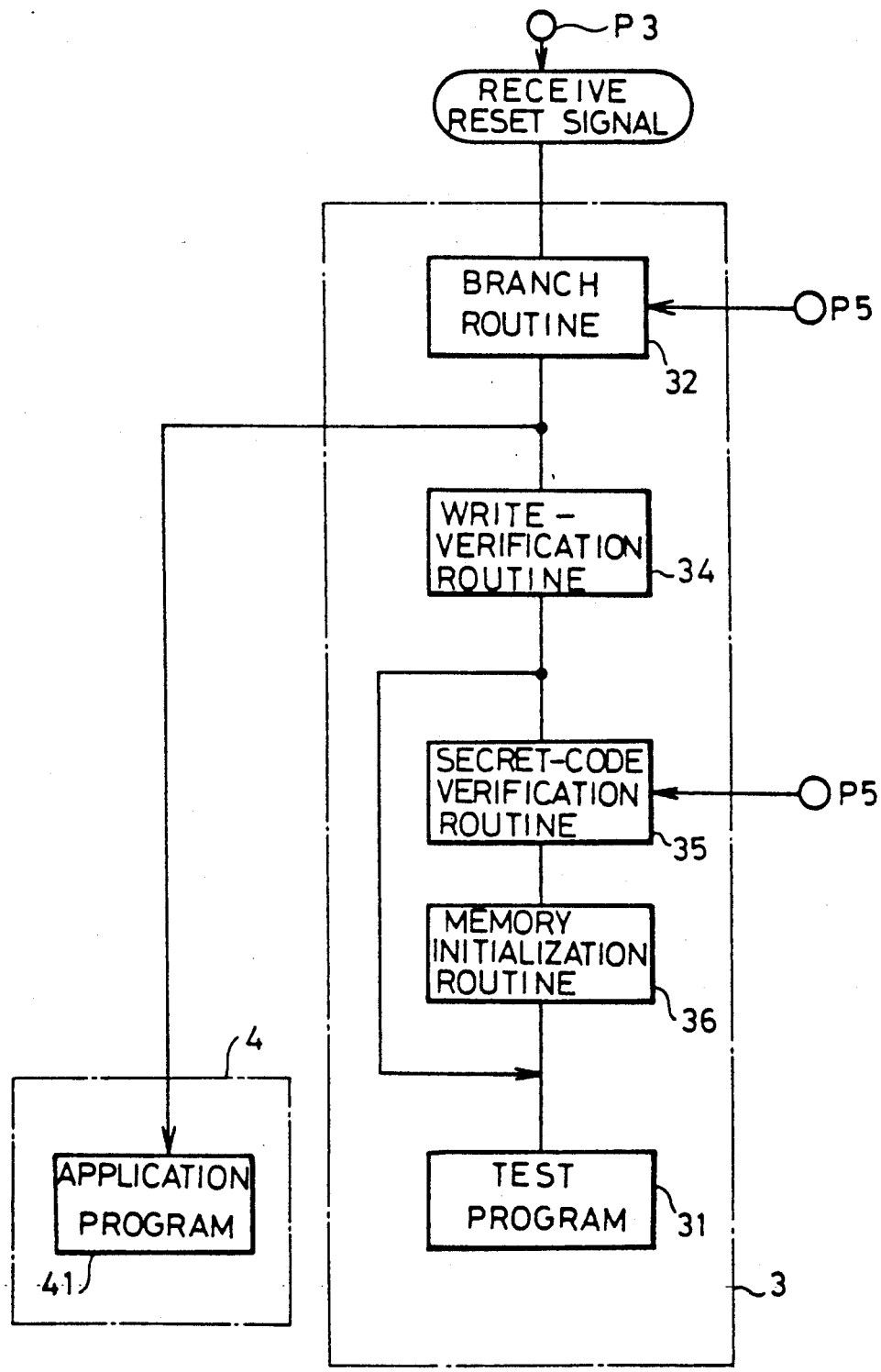
FIG. 3 is a flow chart useful for explaining the operation of an IC card according to the present invention.

FIG. 3 is a flow chart for the programs in the system ROM 3 and the application ROM 4. In this embodiment, the secret code 51 for the card is written and stored in the EEPROM 5, which is a non-volatile memory, as shown in and described with reference to FIG. 1, in the final manufacturing step for completing the IC card. Prior to execution of the test program, the secret code entered from outside the card is collated with the secret code already stored in the card. If the collation is successful, the memory initialization routine 36 is executed and then the test program 31 is executed.

In the EEPROM 5, separate from the secret code 51 for that IC card with which an externally entered secret code is to be collated prior to the execution of the test program 31, the write-verification code 52 is written and stored, which write-verification code 52 indicates whether the secret code 51 has been already stored in the card or not. As in conventional cards, this write-verification code 52 has a bit pattern which coincides neither with the initial values in the EEPROM 5 nor with various other bit patterns which would be set in the EEPROM 5 later. When the IC card is to be tested during manufacturing when the secret code 51 has not yet been written in the EEPROM 5, the memory initializing routine 36 is not executed, but the test program is immediately executed.

More specifically, with reference to the flow chart shown in FIG. 3, when a reset signal is applied at the reset signal terminal P3, the CPU 1 reads out an execution start address for the branch routine 32 from a given address within the system ROM 3, and the execution of the branch routine 32 is started from this execution start address. If a command to execute the test program 31 is entered from external apparatus at the I/O terminal P5, the branch routine 34 causes the CPU 1 to execute the write-verification routine 34. The write-verification routine 34 determines from the write-verification code 52 in the EEPROM 5 whether the secret code 51 has already been written into the EEPROM 5. If the secret code 51 has already been written, the secret-code verification routine 35 is executed. If it has not been written yet, the secret-code collation is not carried out, but the test program 31 is executed immediately.

In the secret-code verification routine 35, the secret code inputted through the I/O terminal P5 is collated with the secret code stored in the EEPROM 5, and if they are coincident with each other the memory initialization routine 36 is executed to initialize the EEPROM 5, whereby personal data relating to the card owner stored in the EEPROM 5 is prevented from being read out.

If no command to execute the test program stored in the system ROM 3 is applied to the I/O terminal P5 from external apparatus, the CPU 1 executes the application program 41.

As described above, according to the present invention, if a secret code for a particular IC card has not been written in the EEPROM 5 provided in that card, the test program can be executed without initializing the EEPROM 5. If, however, the secret code has been already written into the EEPROM 5, the EEPROM 5 is initialized by the memory initialization routine 36. Accordingly, if the test program is executed intentionally or accidentally on such an IC card, personal data relating to the owner of the IC card is prevented from being read out. During the manufacturing of the IC card, the secret code for that card has not been written, and, therefore, initialization of the EEPROM 5 never happens. Thus, according to the present invention, tests on various items, including the EEPROM 5, can be made for the IC cards, prior to shipping the IC cards. Thus, complete testing can be provided for the IC cards.

What is claimed is:

1. An IC card having a test program therein for testing said IC card comprising:
    writable, non-volatile memory means for storing a secret code assigned exclusively to said IC card, a write-verification code for indicating whether a secret code has been stored in said writable, non-volatile memory means, and personal data of a user of said IC card;
    first read-only memory means storing an application program for performing application functions of said IC card;
    second read-only memory means storing a test program for testing said IC card and a branch routine for determining which of the test and application programs to execute in response to an input instruction, a write-verification routine for, when the test program is to be executed, determining from the write-verification code in said writable, non-volatile memory means whether a secret code has already been stored in said writable, non-volatile memory means and for enabling the test program to be executed immediately if a secret code has not yet been stored into said writable, non-volatile memory means, secret code verification means for collating an externally entered code with a secret code stored in said writable, non-volatile memory means when the write-verification routine verifies that a secret code has already been stored in said writable, non-volatile memory means, and an initialization routine for initializing said writable, non-volatile memory means only when the externally entered code coincides with the secret code stored in said writable, non-volatile memory means whereby the personal data stored in said writable, non-volatile memory means cannot be read during execution of the test program and, after the completion of initialization, enabling the test program to be executed;

control means for executing and controlling the respective programs;

input/output control means for controlling signal input and output to and from said IC card from and to apparatus external to said IC card; and a system bus for signal transfer among said non-volatile memory means, first read-only memory means, second read-only memory means, control means, and input/output control means.

2. An IC card according to claim 1 wherein said writable, non-volatile memory means is an electrically erasable, programmable ROM.

3. An IC card according to claim 1 wherein a secret code is written in said writable, non-volatile memory means after execution of the test program during manufacturing of said IC card.

* * * * *